UNITED STATES PATENT OFFICE.

WALTER JAMES BROWNING, OF HUELVA, SPAIN.

PROCESS FOR THE EXTRACTION OF METALS.

1,407,324. Specification of Letters Patent. Patented Feb. 21, 1922.

No Drawing. Application filed August 28, 1920. Serial No. 406,710.

*To all whom it may concern:*

Be it known that I, WALTER JAMES BROWNING, a subject of the King of the United Kingdom of Great Britain and Ireland, and residing at Huelva, Spain, have invented a certain new and useful Improvement in Processes for the Extraction of Metals, (for which I filed application in Great Britain July 31, 1919,) of which the following is a specification.

This invention relates to a process for the extraction of metals; and particularly to such a process wherein the metal or metals are precipitated from solution as sulfide or sulfides by means of sulfurous gases.

The precipitating sulfurous gases employed are produced by burning, calcining or distilling sulfur-bearing minerals, in the presence of water vapor or steam. These gases comprise as their effective constituents hydrogen sulfide and sulfur dioxide. The gases are passed through the solutions which contain, for example, soluble salts of copper and the copper or other metals are precipitated as the sulfide or sulfides. This precipitate is removed and treated to recover the metal or metals in any approved manner.

The residual gases are rich in sulfur dioxide which would pass off as a waste product unless treated by the method contemplated by this invention. This method comprises passing this sulfur dioxide in the presence of free oxygen through a zone of incandescent carbonaceous material. If necessary, water vapor or steam are also added to the gaseous mixture to supply the necessary hydrogen, although in some cases the natural humidity of the gases or the hydrogen content of the materials used to form the carbonaceous zone furnish sufficient hydrogen. By introducing free oxygen with the $SO_2$ the carbonaceous matter is maintained constantly at incandescence and at the optimum temperature. By this method a substantial part of the sulfur dioxide is reduced and converted into hydrogen sulfide, as more specifically discussed in applicant's copending application, Serial No. 337,585.

The gases emerging from the zone of incandescence are repassed through the solution of metallic salts and precipitate a further quantity of sulfide or sulfides.

By thus treating the resultant sulfur dioxide to convert its sulfur content into hydrogen sulfide, there is no ultimate waste of sulfur and the only sulfur removed from the system is that which is eliminated as the sulfide precipitate, and, as a matter of fact, this also may be recovered during the subsequent roasting.

I claim:

1. A process for the extraction of metals from solution which comprises passing sulfurous gases containing hydrogen sulfide through the solution to precipitate the metals as sulfides, treating the residual gases to convert at least a part of their sulfur content to hydrogen sulfide, and repassing them through the solution.

2. A process for the extraction of metals from solution which comprises passing gases containing hydrogen sulfide and sulfur dioxide through the solution to precipitate the metals as sulfides, treating the residual sulfur dioxide to convert the sulfur content of at least a part of it to hydrogen sulfide, and repassing it through the solution.

3. A process for the extraction of metals from solution which comprises passing sulfurous gases containing hydrogen sulfide through the solution to precipitate the metals as sulfides, passing the residual gas through an incandescent carbonaceous zone while regulating the supply of oxygen and maintaining the optimum temperature of the carbonaceous matter, and repassing the gaseous product of this treatment through the solution.

4. A process for the extraction of metals from solution which comprises passing gases containing hydrogen sulfide and sulfur dioxide through the solution to precipitate the metals as sulfides, passing the residual sulfur dioxide through the incandescent carbonaceous zone while regulating the supply of oxygen and maintaining the optimum temperature of the carbonaceous matter to convert the sulfur content of at least a part of the sulfur dioxide to hydrogen sulfide and repassing it through the solution.

5. A process for the extraction of copper from solution which comprises passing gases containing hydrogen sulfide and sulfur dioxide through a solution of a copper salt to precipitate the copper as copper sulfide, treating the residual sulfur dioxide to convert the sulfur content of at least a part of it to hydrogen sulfide, and repassing the gases thus treated through the copper solution.

In testimony whereof I have signed my name to this specification in the presence of two subscribing witnesses.

WALTER JAMES BROWNING.

Witnesses:
 GEO. ROGERS,
 F. W. COOPER.